(12) United States Patent
Yura et al.

(10) Patent No.: US 10,664,586 B2
(45) Date of Patent: May 26, 2020

(54) PROGRAM ACQUISITION METHOD, AND INFORMATION PROCESSING TERMINAL

(71) Applicant: FUJITSU LIMITED, Kawasaki-shi, Kanagawa (JP)

(72) Inventors: Junichi Yura, Kawasaki (JP); Takashi Ohno, Kobe (JP); Hideto Kihara, Kawasaki (JP); Masahide Noda, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 142 days.

(21) Appl. No.: 15/696,858

(22) Filed: Sep. 6, 2017

(65) Prior Publication Data
US 2018/0012013 A1 Jan. 11, 2018

Related U.S. Application Data

(63) Continuation of application No. PCT/JP2015/056821, filed on Mar. 9, 2015.

(51) Int. Cl.
*G06F 21/44* (2013.01)
*H04W 12/10* (2009.01)
(Continued)

(52) U.S. Cl.
CPC ............... *G06F 21/44* (2013.01); *G06F 8/61* (2013.01); *G06F 8/62* (2013.01); *G06F 9/445* (2013.01);
(Continued)

(58) Field of Classification Search
CPC ........ G06F 21/44; G06F 9/44505; G06F 8/62; G06F 8/61; G06F 9/445; H04L 63/107; H04W 12/10
See application file for complete search history.

(56) References Cited

U.S. PATENT DOCUMENTS

2011/0162076 A1* 6/2011 Song .................. G06F 21/554
726/26
2011/0276964 A1 11/2011 Ogawa et al.
(Continued)

FOREIGN PATENT DOCUMENTS

JP 2003-263332 9/2003
JP 2011-96173 5/2011
(Continued)

OTHER PUBLICATIONS

European Extended Search Report dated Jan. 31, 2018 in Application No. 15884527.1.
(Continued)

*Primary Examiner* — Meng Li
(74) *Attorney, Agent, or Firm* — Staas & Halsey LLP

(57) ABSTRACT

A program acquisition method performed by an information processing terminal, includes calculating a degree of matching a first condition that authorizes access to a predetermined program with respect to a condition detected in relation to the information processing terminal, acquiring the predetermined program and storing the acquired predetermined program in a storage in response to the degree of matching being within a predetermined range from a first value indicating that the degree of matching satisfies the first condition, and restricting the access to the predetermined program stored in the storage until the degree of matching indicates the first value.

9 Claims, 13 Drawing Sheets

(51) Int. Cl.
*G06F 9/445* (2018.01)
*G06F 8/61* (2018.01)
*H04L 29/06* (2006.01)

(52) U.S. Cl.
CPC ........ *G06F 9/44505* (2013.01); *H04L 63/107* (2013.01); *H04W 12/10* (2013.01)

(56) References Cited

U.S. PATENT DOCUMENTS

| | | | |
|---|---|---|---|
| 2012/0011027 A1 | 1/2012 | Okuyama | |
| 2014/0143149 A1* | 5/2014 | Aissi | G06F 21/31 705/44 |
| 2014/0156721 A1 | 6/2014 | Kihara et al. | |
| 2014/0250433 A1* | 9/2014 | Stekkelpak | G06F 9/44505 717/176 |
| 2014/0359102 A1 | 12/2014 | Kihara et al. | |
| 2015/0358329 A1* | 12/2015 | Noda | G06F 21/57 726/4 |

FOREIGN PATENT DOCUMENTS

| | | |
|---|---|---|
| JP | 2014-112321 | 6/2014 |
| JP | 2014-232372 | 12/2014 |
| WO | WO 2010-079772 A1 | 7/2010 |
| WO | WO 2010/109776 A1 | 9/2010 |

OTHER PUBLICATIONS

Packaged Web Apps format (see http://www.w3.org/TR/widgets/), "Packaged Web Apps (Widgets)—Packaging and XML Configuration (Second Edition), W3C Recommendation Nov. 27, 2012", World Wide Web Consortium, pp. 1-83 (2012).
International Search Report dated May 26, 2015 corresponding to International Patent Application No. PCT/JP2015/056821.
Written Opinion of the International Search Authority dated May 26, 2015 corresponding to International Patent Application No. PCT/JP2015/056821.
European Patent Office English Abstract for Japanese Publication No. 2014-112321, published Jun. 19, 2014.
European Patent Office English Abstract for Japanese Publication No. 2014-232372, published Dec. 11, 2014.
European Patent Office English Abstract for Japanese Publication No. 2011-96173, published May 12, 2011.
European Patent Office English Abstract for Japanese Publication No. 2003-263332, published Sep. 19, 2003.

* cited by examiner

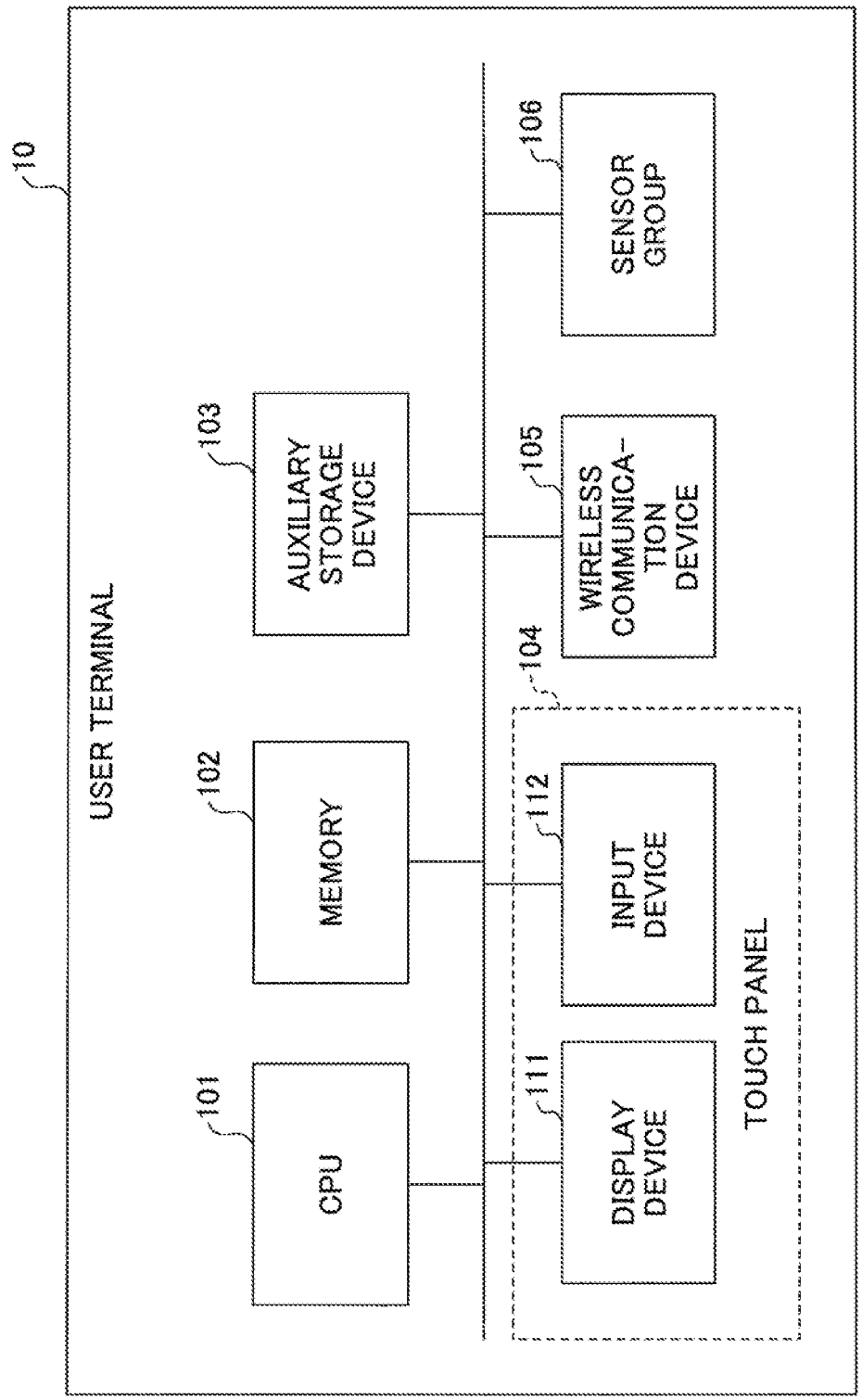

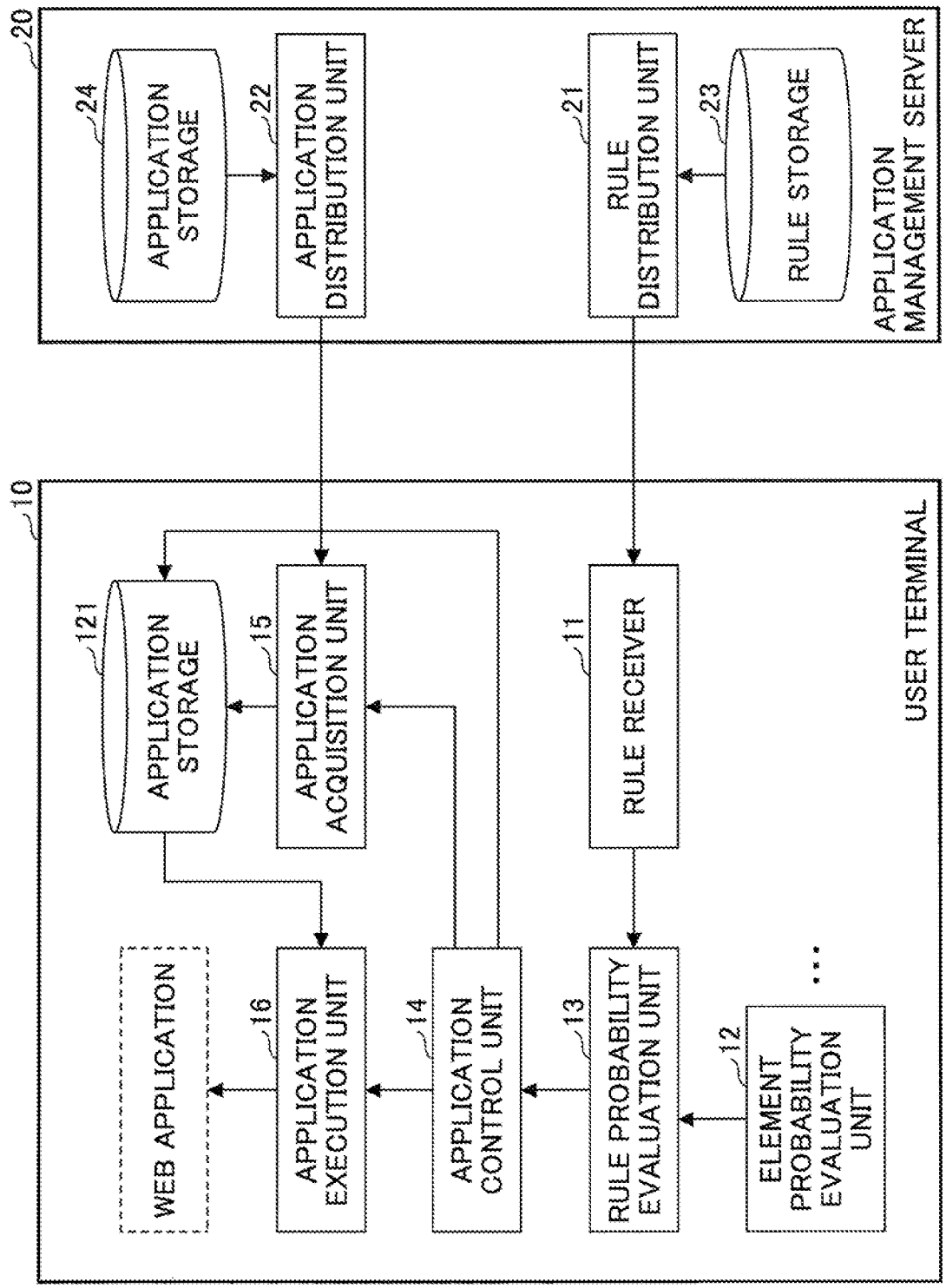

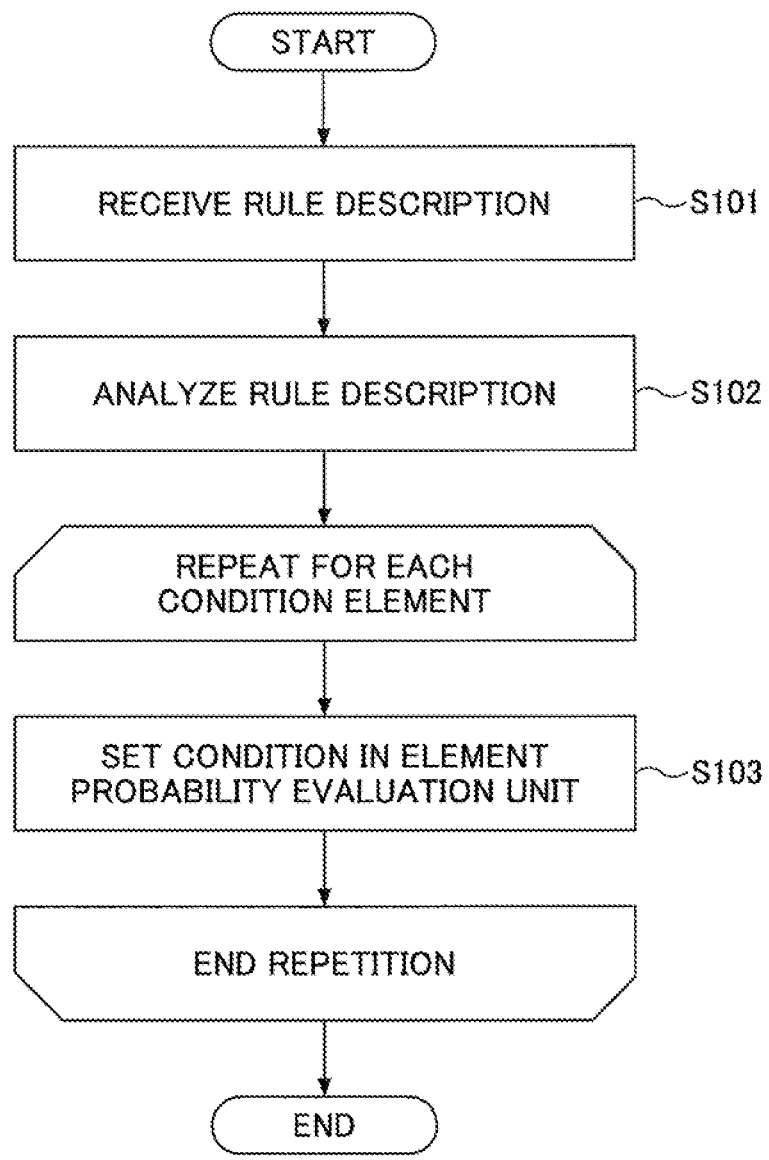

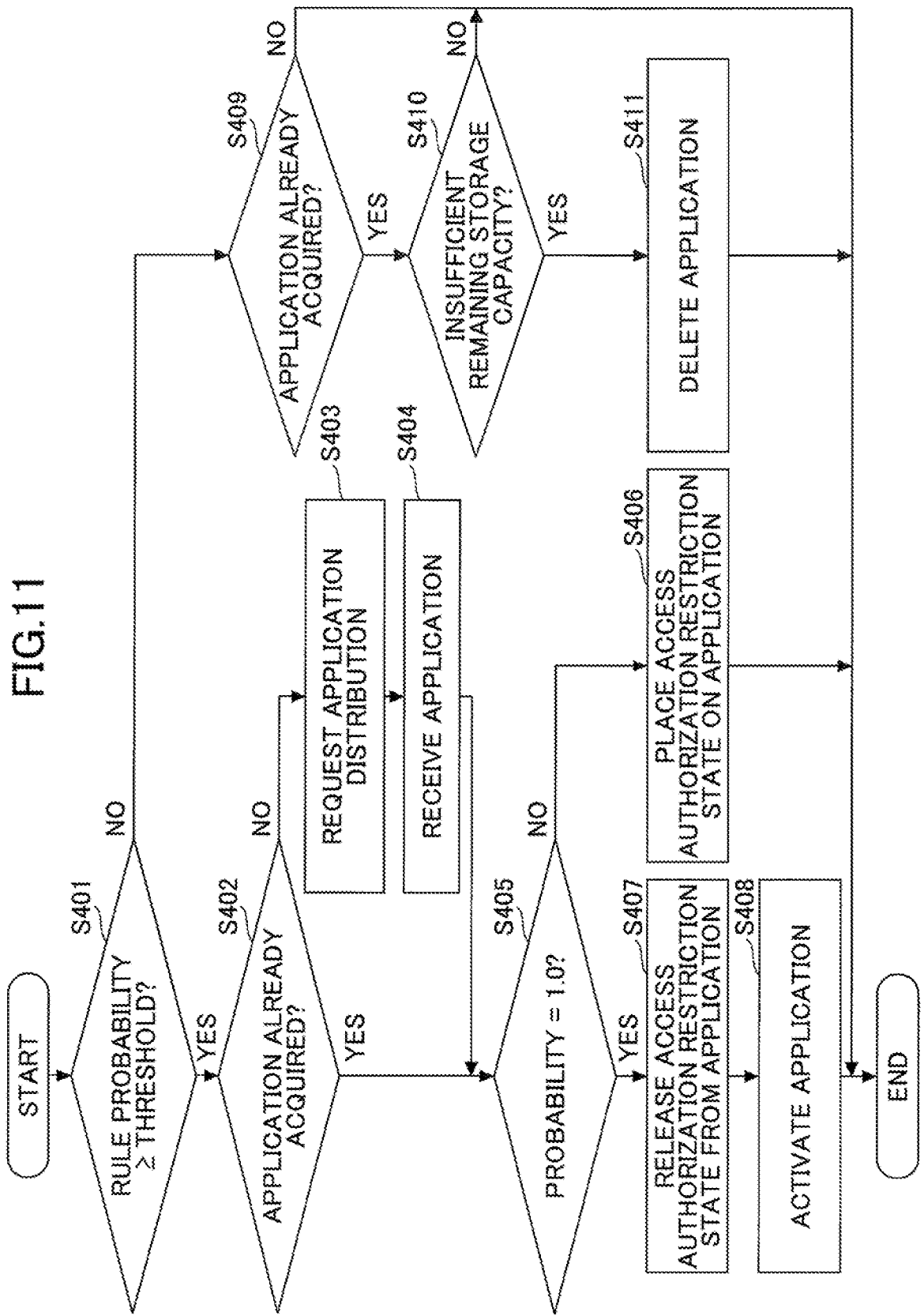

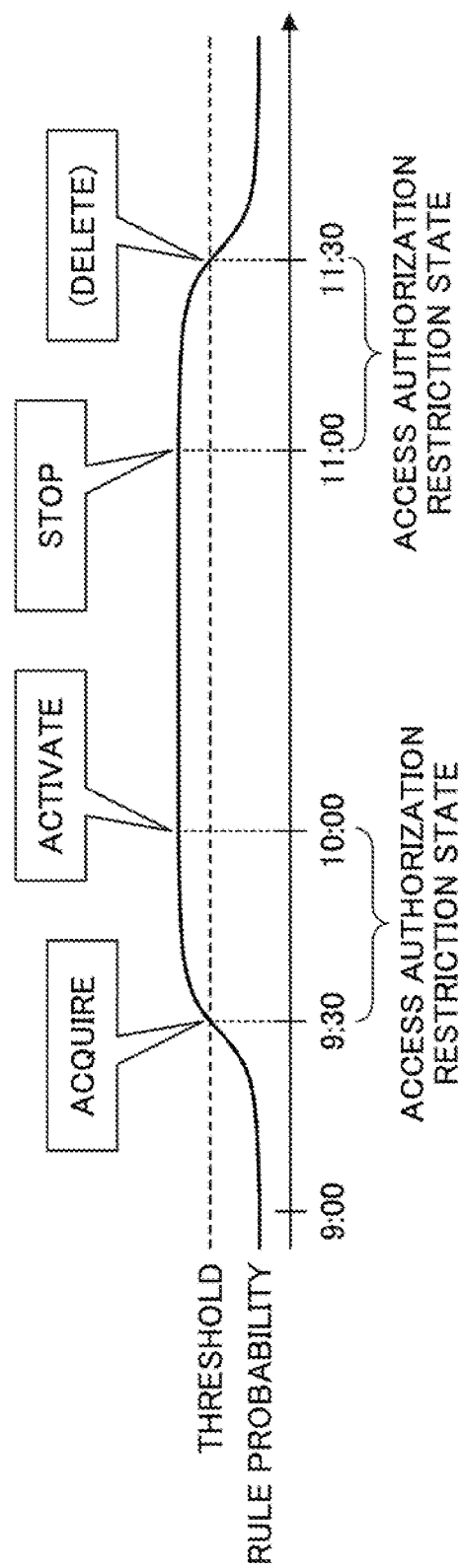

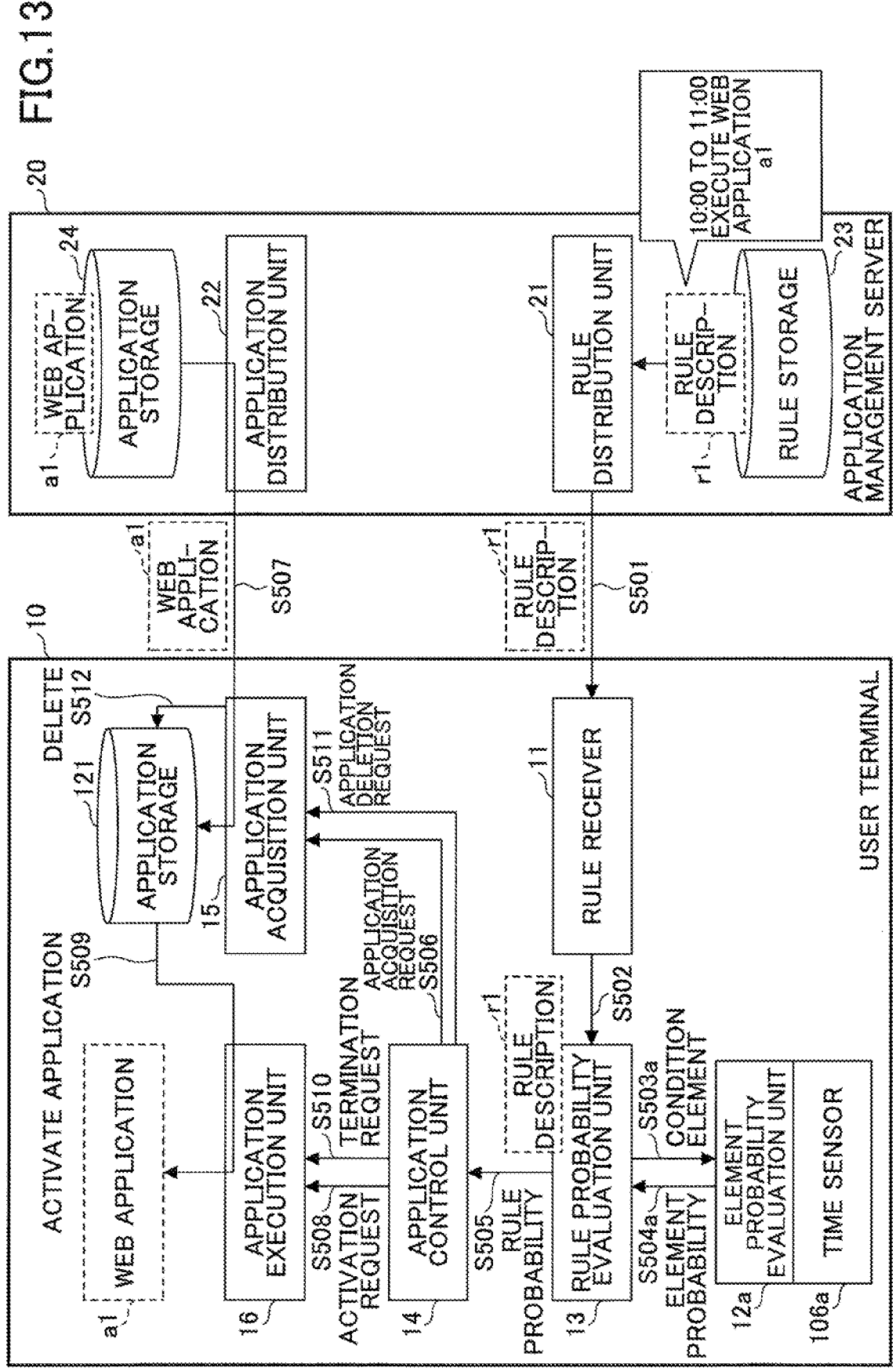

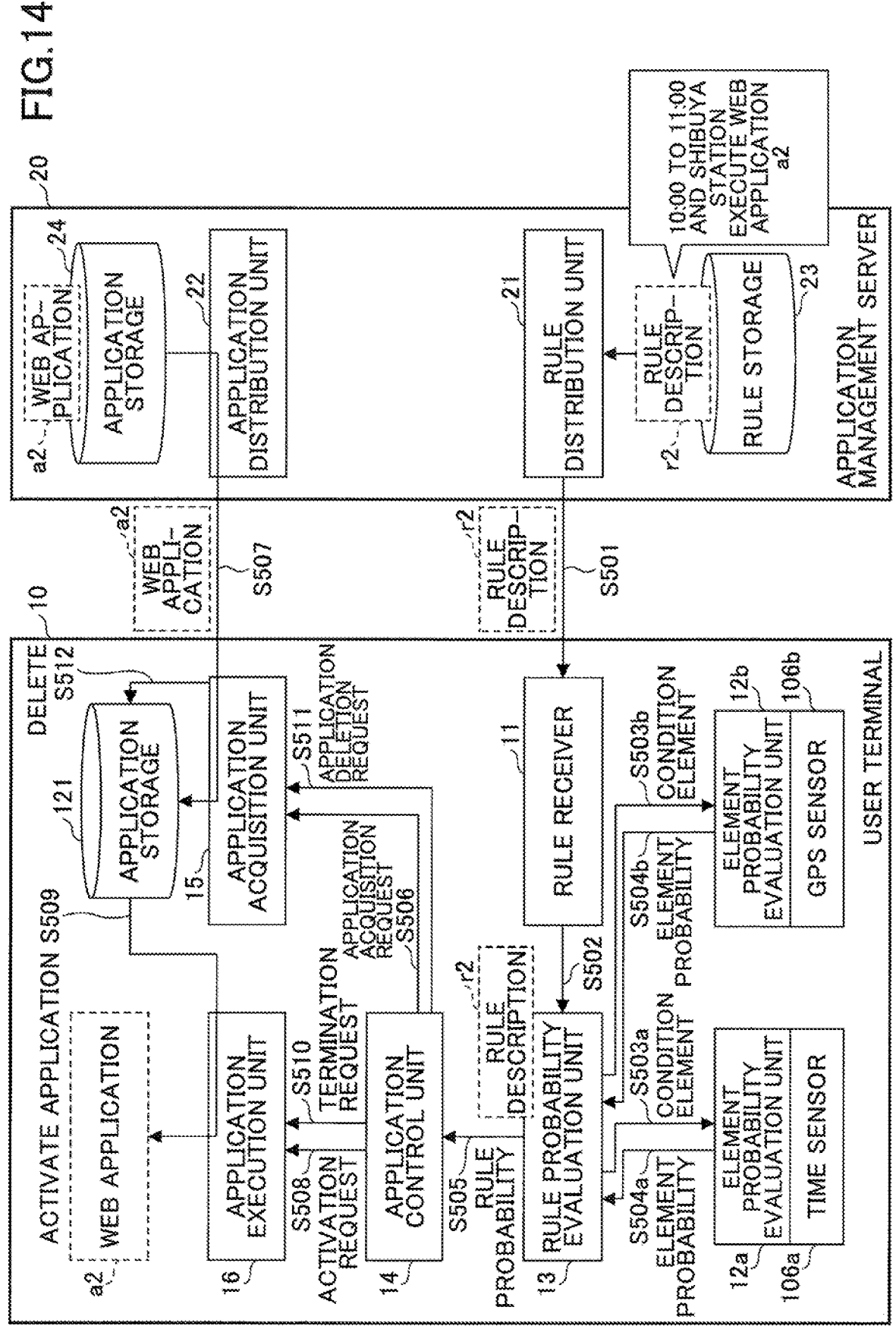

PROGRAM ACQUISITION METHOD, AND INFORMATION PROCESSING TERMINAL

CROSS-REFERENCE TO RELATED APPLICATIONS

This application is a continuation application of International Application PCT/JP2015/056821 filed on Mar. 9, 2015 and designated the U.S., the entire contents of which are incorporated herein by reference.

FIELD

The disclosures discussed herein relate to a program acquisition method, an information processing terminal, and a non-transitory computer-readable recording medium storing a program.

BACKGROUND

There is a mechanism for automatically distributing applications to an information processing apparatus such as a smartphone corresponding to a condition (location or time) of a user of the information processing terminal. For example, when the user's condition is detected and the detected condition has reached a predetermined condition, an application corresponding to the predetermined condition is distributed to the information processing terminal of the user. In other words, access to such applications are authorized only under certain circumstances.

RELATED ART DOCUMENTS

Patent Documents

Patent Document 1: International Publication Pamphlet No. WO 2010/109776
Patent Document 2: Japanese Laid-open Patent Publication No. 2014-112321
Patent Document 3: International Publication Pamphlet No. WO 2010/079772

SUMMARY

According to an aspect of embodiments, a program acquisition method performed by an information processing terminal includes calculating a degree of matching a first condition that authorizes access to a predetermined program with respect to a condition detected in relation to the information processing terminal; acquiring the predetermined program and storing the acquired predetermined program in a storage in response to the degree of matching being within a predetermined range from a first value indicating that the degree of matching satisfies the first condition; and restricting the access to the predetermined program stored in the storage until the degree of matching indicates the first value.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 2 is a diagram illustrating a hardware configuration example of a user terminal according to an embodiment;
FIG. 3 is a diagram illustrating functional configuration examples of an application management server and a user terminal according to an embodiment;
FIG. 4 is a flowchart illustrating an example of a process executed by a user terminal in response to reception of a rule description;
FIG. 5 is a diagram illustrating a configuration example of a rule description;
FIG. 11 is a flowchart illustrating an example of a process executed in response to reception of a rule probability by an application controller;
FIG. 12 is a diagram illustrating an example of control relating to a Web application;
FIG. 13 is a diagram illustrating process contents executed by a user terminal with respect to a first rule description;
FIG. 14 is a diagram illustrating process contents executed by a user terminal with respect to a second rule description.

DESCRIPTION OF EMBODIMENTS

When an application has started being distributed after a predetermined condition has been satisfied, the user may have difficulty in immediately accessing and using the application under the predetermined condition. Further, when the information processing terminal fails to be connected to a network in such a predetermined condition, the user is unable to obtain the application despite the user's condition satisfying the predetermined condition.

Figure 1:
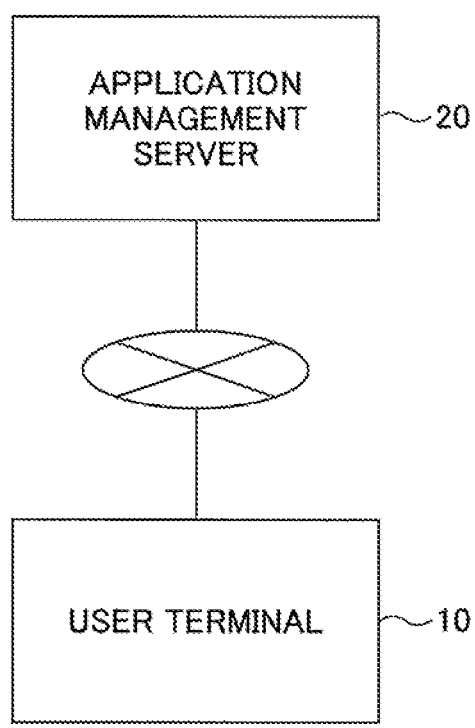
FIG. 1 is a diagram illustrating a system configuration example according to an embodiment.

Embodiments of the present invention will be described below with reference to the accompanying drawings. FIG. 1 is a diagram illustrating a system configuration example according to an embodiment. In FIG. 1, an application management server 20 is enabled to communicate with one or more user terminals 10 via a wireless communication such as a wireless LAN (Local Area Network), a mobile communication network, or the like, or a wired communication such as a wired LAN or a serial communication. For convenience of explanation, it is assumed that the system configuration illustrated in FIG. 1 is configured by a certain company (hereinafter referred to as "company A").

The user terminal 10 is a terminal configured to be directly operated by a user. Examples of the user terminal 10 include a smart phone and a smart terminal such as a tablet terminal. However, another type of an information processing terminal such as a PC (Personal Computer) or the like capable of performing wireless or wired communication may be used as the user terminal 10.

The application management server 20 is a computer configured to distribute to each user terminal 10 a Web application program (hereinafter referred to as "Web application") corresponding to a context of a user of the corresponding user terminal 10. A context is a concept indicating a user's situation or condition, such as a current location, current date and time, a current weather, or the like. Note that the user terminal 10 is carried by a user. Hence, the context of the user may be a context relating to the user terminal 10.

Note that the Web application is an application program including HTML (HyperText Markup Language), CSS (Cascading Style Sheets), JavaScript (registered trademark), and the like. For example, the web application in this embodiment may be a web application of Packaged Web Apps format (see http://www.w3.org/TR/widgets/).

Note that the Web application is an application program including HTML (HyperText Markup Language), CSS (Cascading Style Sheets), JavaScript (registered trademark), and the like. For example, the web application in this embodiment may be a web application of Packaged Web Apps format (see http://www.w3.org/TR/widgets/).

FIG. 2 is a diagram illustrating a hardware configuration example of a user terminal according to an embodiment. In FIG. 2, the user terminal 10 includes a CPU 101, a memory 102, an auxiliary storage device 103, a touch panel 104, a wireless communication device 105, a sensor group 106, and the like.

The auxiliary storage device 103 stores a program or the like installed in the user terminal 10. The memory 102 reads a program from the auxiliary storage device 103 and stores the read program when an instruction to activate the program is received. The CPU 101 implements a function of the user terminal 10 according to the program stored in the memory 102.

The touch panel 104 is an electronic component having both an input function and a display function, and displays information, receives input from a user, and the like. The touch panel 104 includes a display device 111, an input device 112, and the like.

The display device 111 is a liquid crystal display or the like, and is responsible for a display function of the touch panel 104. The input device 112 is an electronic component including a sensor configured to detect contact of a contacted object with the display device 111. The system of detecting the contact of the contacted object may be any of known systems including an electrostatic system, a resistive film system, an optical system, or the like. Note that the contacted object is an object that is in contact with a contact surface (surface) of the touch panel 104. An example of such an object is a user's finger or a dedicated or general pen. The wireless communication device 105 is an electronic component required for performing wireless communication.

The sensor group 106 is a collection of one or more types of sensors. For example, a GPS (Global Positioning System) sensor, a time sensor (timer), an NFC (Near field communication) sensor, and the like may constitute the sensor group 106. In the present embodiment, the sensor group 106 is used for identifying the context of the user, of the user terminal 10.

FIG. 3 is a diagram illustrating functional configuration examples of an application management server and a user terminal according to an embodiment. In FIG. 3, the application management server 20 includes a rule distribution unit 21, an application distribution unit 22, and the like. These units may be implemented by a process which, when executed by processors, cause a CPU of the application management server 20 to execute one or more programs installed in the application management server 20. The application management server 20 also uses a rule storage 23, an application storage 24, and the like. Each of these storages may be implemented by using an auxiliary storage device included by the application management server 20 or a storage device connectable to the application management server 20 via a network.

The rule distribution unit 21 distributes to each user terminal 10 a rule description stored in the rule storage 23. Rule description refers to data in which rules are described. A rule indicates information including conditions for executing a Web application (hereinafter called a "Web application execution condition"). The Web application execution condition is a condition to be satisfied in order to authorize the execution (or use) of the Web application. The execution condition is set based on the context. That is, the execution condition is information indicating the context authorized to execute the Web application. Each execution condition may include a combination of a plurality of states or situations. Examples of the execution condition include the following Examples 1 to 3.

Example 1) only executable between 10:00 and 11:00
Example 2) executable between 10:00 and 11:00 and inside the Musashi-Nakahara station
Example 3) executable between 10:00 and 11:00 or inside the Musashi-Nakahara station The rule storage 23 stores a rule description for each Web application. Note that, when execution of two or more Web applications is authorized for the same context, one rule description may be set for a set of these Web applications (hereinafter referred to as an "application set"). The distribution of the rule description is performed, for example, in accordance with registration of the rule in the rule storage 23.

The application distribution unit 22 distributes the Web application related to the rule description to the user terminal 10 that satisfies the execution condition in the rule description. The application storage 24 stores candidate distribution Web applications.

The user terminal 10 includes a rule receiver 11, an element probability evaluation unit 12, a rule probability evaluation unit 13, an application controller 14, an application acquisition unit 15, an application execution unit 16, and the like. These units are implemented by a process which causes the CPU 101 to execute one or more programs installed in the user terminal 10. The user terminal 10 also has an application storage 121. The application storage 121 may be implemented by using the auxiliary storage device 103, for example.

The rule receiver 11 receives a rule description distributed from the application management server 20. The rule receiver 11 sets the received rule description in the rule probability evaluation unit 13.

The element probability evaluation unit 12 is disposed for each sensor constituting the sensor group 106. The element probability evaluation unit 12 evaluates a matching level (hereinafter referred to as "element probability") of a value detected by a sensor corresponding to the element probability evaluation unit 12 to the condition element corresponding to the sensor, among the constituent elements of the execution condition (hereinafter referred to as "conditional elements") included in the rule description. The condition element is a condition corresponding to one situation constituting an execution condition. For example, under the execution condition of the above example 2, "between 10:00 and 11:00" and "inside Musashi-Nakahara station" correspond to condition elements. The former condition element has a condition for time, and the latter condition element is a condition for a locational position. Hence, in this case, the element probability relating to the former condition element is evaluated by the element probability evaluation unit 12 corresponding to a sensor acting as a clock. The element probability relating to the latter condition element is evaluated by the element probability evaluation unit 12 corresponding to a GPS sensor.

The element probability is information indicating an extent to which a current situation regarding the user terminal 10 matches a situation satisfying the condition element, or indicating an extent to which the current situation approximates the situation satisfying the condition element.

The rule probability evaluation unit 13 evaluates the probability of satisfying the execution condition of the rule description for each rule description. The probability of satisfying the execution condition of the rule description (hereinafter referred to as "rule probability") is evaluated based on the element probability for each condition element constituting the execution condition. That is, the rule probability is information indicating an extent to which a current situation regarding the user terminal 10 matches a situation satisfying the execution condition, or indicating an extent to which the current situation approximates the situation satisfying the execution condition.

The application controller 14 determines an acquisition time and an activation time of the Web application. For example, when the rule probability evaluated by the rule probability evaluation unit 13 is equal to or greater than a threshold, the application controller 14 instructs the application acquisition unit 15 to acquire the Web application relating to the rule probability. Further, when the rule probability evaluated by the rule probability evaluation unit 13 reaches 1.0 (100%), the application controller 14 instructs the application execution unit 16 to activate the Web application relating to the rule probability.

The application acquisition unit 15 acquires (downloads) from the application management server 20 the Web application indicated for acquisition by the application controller 14. The acquired Web application is stored in the application storage 121. At this time, the acquired Web application is stored in the application storage 121 in a state in which accessibility to the Web application by the user is limited (hereinafter referred to as "access authorization restriction state"). This is because when the Web application is acquired by the application acquisition unit 15, the execution condition of the Web application is not satisfied, and hence, it is not appropriate to authorize the accessibility to the Web application until the execution condition is satisfied. The method of implementing the access authorization restriction state is not restricted to a predetermined method. For example, the existence of the Web application may be concealed from the user. The concealment of the existence of the Web application may be achieved by not displaying an icon of the Web application on the home screen. In addition, the Web application may be encrypted and stored in the application storage 121 such that the Web application is unable to be decrypted even when the Web application is accessed. Alternatively, activation of the Web application is not allowed regardless of whether the icon of the Web application is displayed on the home screen. Further, access to some functions of the Web application may be restricted.

The application execution unit 16 starts the Web application indicated for acquisition by the application controller 14.

The following describes a process executed by the user terminal 10. FIG. 4 is a flowchart illustrating an example of a process executed by a user terminal in response to reception of a rule description.

In step S101, the rule receiver 11 receives a rule description distributed by the rule distribution unit 21 of the application management server 20. The rule receiver 11 may receive more than one rule description simultaneously. The rule receiver 11 sets the received rule description in the rule probability evaluation unit 13.

Subsequently, the rule probability evaluation unit 13 analyzes the set rule probability, and extracts the condition element and the logical operator between the condition elements from the rule description (S102).

FIG. 5 is a diagram illustrating a configuration example of a rule description. FIG. 5 illustrates an example of the rule description. In FIG. 5, the rule description includes a rule ID, an application ID, an execution condition, and the like. The rule ID is identification information for each rule description. The application ID is identification information for each Web application or for each set of applications (hereinafter called "application set"). The execution condition is an execution condition for the web application related to the application ID in the rule description.

In FIG. 5, the execution condition is described as "AND (A, B)". In the execution condition in FIG. 5, "AND" is a logical operator indicating a logical relation between the condition elements specified in arguments (values indicated by a comma delimiter in parentheses following AND). Three or more arguments (conditional elements) may be listed in the parentheses. Each of "A" and "B", which is an argument of the AND operator, is a condition element. Note that although specific conditions are specified for "A" and "B" in practice, in FIG. 5, each condition element is encoded and represented for convenience. For example, "A" may be "10:00 to 11:00" and "B" may be "inside the Musashi-Nakahara station".

Accordingly, in step S102, "A" and "B" are extracted as condition elements, and "AND" is extracted as a logical operator. Examples of the logical operator include AND, OR, NOT, SEQ, and the like. In the present embodiment, the meaning of each logical operator is, for example, as follows.

The AND operator indicates the mean ($1/n \Sigma S_i$) of the element probabilities of all the condition elements of the argument.

The OR operator indicates the maximum value (max $\{S_1, S_2, \ldots S_n\}$) of the element probabilities of all the condition elements of the argument.

The NOT operator indicates the value (1−S) obtained by subtracting the element probability of the condition element of the argument from 1. Note that there is only one argument of the NOT operator.

The SEQ operator indicates the mean ($1/n \Sigma S_i$) of all the element probabilities with respect to the process by which the element probabilities of all the condition elements of the arguments are satisfied, in terms of the order of arguments. That is, the SEQ operator is different from the AND operator in that there is a restriction with respect to the order in which the condition elements are satisfied. For example, in a case of SEQ (A, B, C), it is required that condition elements are satisfied (element probability is 1.0) in the order of A, B, and C. In a hypothetical case of the element probability of B or C becoming 1.0 under the condition of the element probability of A being 0.0, the value of the SEQ operator is 0.0. Further, when the element probability of C becomes 1.0 after the element probability of A reaches 1.0 and before the element probability of B reaches 1.0, the value of the SEQ operator is also 0.0.

In the above, n is the number of arguments. $S_i$ is the element probability of the condition element related to the ith argument.

The meaning of each of the above logical operators may be appropriately changed. Further, other logical operators may be added.

Subsequently, the rule probability evaluation unit 13 sets the condition element and the rule ID in the element probability evaluation unit 12 corresponding to the extracted condition element for each extracted condition element (S103). The element probability evaluation unit 12 in which the element is set stores, for example, the condition element in the memory 102 in association with the rule ID.

Figure 6:
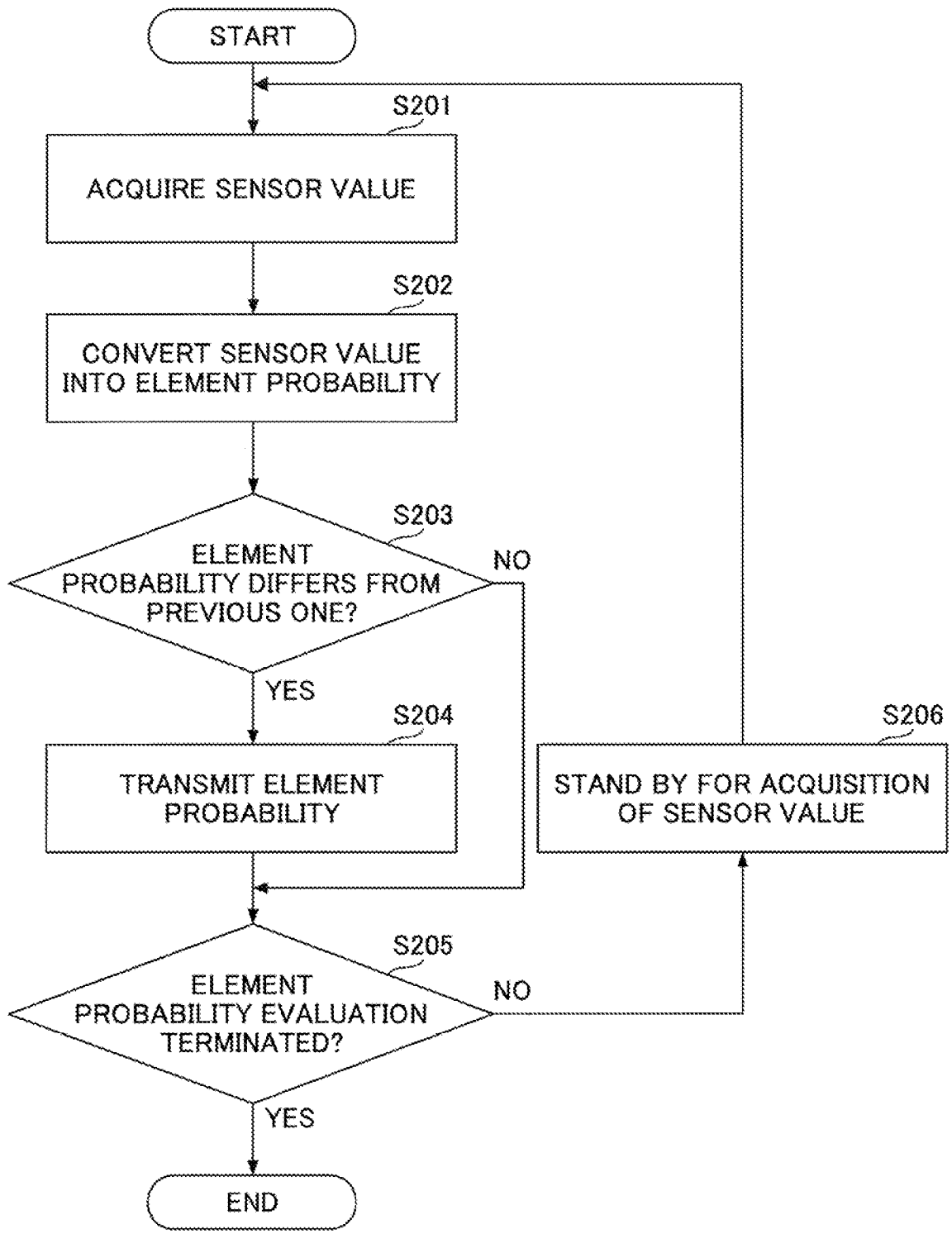
FIG. 6 is a flowchart illustrating an example of a process executed by an element probability evaluation unit.

Next, a process executed by each element probability evaluation unit 12 in which condition elements are set will be described. FIG. 6 is a flowchart illustrating an example of a process executed by an element probability evaluation unit.

In step S201, the element probability evaluation unit 12 acquires values (hereinafter referred to as "sensor values") detected, sensed, measured, or gauged by the sensor corresponding to the element probability evaluation unit 12 of interest among the sensors of the sensor group 106. Subsequently, the element probability evaluation unit 12 converts the acquired sensor value into an element probability based on the condition element set in the element probability evaluation unit 12 of interest (S202). The conversion of the sensor value to the element probability is performed, for example, based on the evaluation function which has been implemented in advance for each element probability evaluation unit 12. For example, when a condition element is a condition element for time, conversion to element probability may be performed by an evaluation function as illustrated in FIG. 7.

Figure 7:
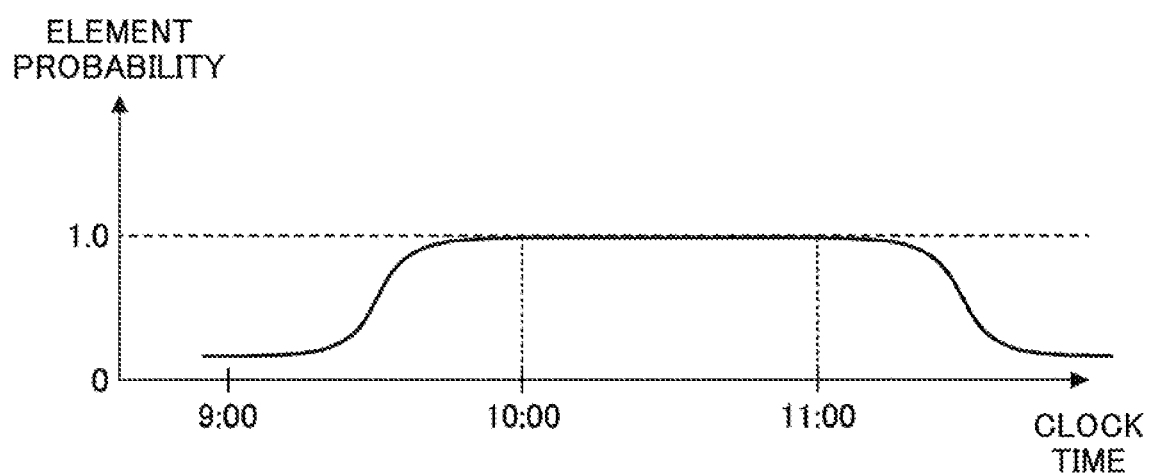
FIG. 7 is a diagram illustrating a first conversion example from a sensor value to an element probability.

FIG. 7 is a diagram illustrating a first conversion example from a sensor value to an element probability. FIG. 7 illustrates an example of the evaluation function when the condition element is 10:00 to 11:00. That is, the curve illustrated in FIG. 7 is a curve representing the evaluation function.

The example of FIG. 7 illustrates an evaluation function where the element probability rises as the time approaches 10 o'clock, the element probability becomes 1.0 in a period from 10:00 to 11:00, and the element probability starts decreasing after 11:00. In a case of the condition element for time, as the direction of change is in one direction, time immediately after 11:00 may be considered to have the lowest degree of matching the element condition. Accordingly, immediately after 11:00, an evaluation function that the element probability becomes 0.0 may be used. Note that similar to the condition element for time, regarding an event that changes constantly in one direction, the degree of matching a certain situation may be accurately identified.

Even for an event in which the rate of change is relatively slow, such as location, temperature, humidity, etc., an evaluation function may be generated in a similar manner as in FIG. 7. In other words, the sensor value may be converted into element probability by an evaluation function in which the element probability becomes closer to 1.0 as the sensor value is closer to the range specified in the element condition.

The element probability evaluation unit 12 corresponding to a sensor having a discrete value as a sensor value, such as the value stored in the NFC tag, may convert the sensor value into the element probability, for example, based on the transition probability between the sensor values.

Figure 8:
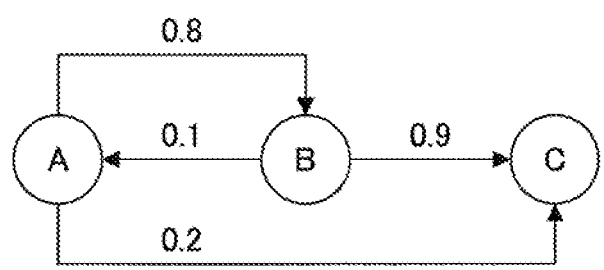
FIG. 8 is a diagram illustrating a second conversion example from a sensor value to an element probability.

FIG. 8 is a diagram illustrating a first conversion example from a sensor value to an element probability. In FIG. 8, the values (A, B, C) in each circle are, for example, the values (sensor values) stored in each of the three NFC tags. FIG. 8 illustrates that the probability that B is detected after A is detected is 0.8, and the probability that C is detected after A is detected is 0.2. In addition, FIG. 8 illustrates that the probability that C is detected after B is detected is 0.9, and the probability that A is detected after B is detected is 0.1.

Such a transition probability may be a probability that the user moves from a position where a given NFC tag is arranged to a position where another NFC tag is arranged. That is, the sensor value related to the NFC tag may be interpreted as information for identifying the arrangement position of the NFC tag. For example, it is assumed that an NFC tag relating to C is installed at a user's workplace, an NFC tag relating to B is installed at a main gate of the workplace, and an NFC tag A is installed at the nearest station in the workplace. In this case, when the user reaches the point A, there is a possibility that the user is heading toward the point C. In FIG. 8, this possibility is illustrated as an element probability of 0.2. Further, when the user reaches B, the possibility of heading toward the point C is higher. In FIG. 8, this possibility is illustrated as an element probability of 0.9.

The element probability evaluation unit 12 having an evaluation function as illustrated in FIG. 8 and having C set as an element condition outputs 0.2 as the element probability when A is acquired as the sensor value, for example.

Subsequently, the element probability evaluation unit 12 determines whether the latest element probability obtained in step S202 differs from the element probability obtained at the previous acquisition of the sensor value (S203). When the latest element probability differs from the previous element probability (Yes in S203), the element probability evaluation unit 12 sends the latest element probability and the rule ID corresponding to the condition element related to the element probability to the rule probability evaluation unit 13 (S204). When the latest element probability is the same as the previous element probability (No in S203), step S204 will not be executed.

Subsequently, the element probability evaluation unit 12 determines whether to end the evaluation of the element probability (S205). When determining that the evaluation of the element probability needs to be continued (No in S205), the element probability evaluation unit 12 stands by for acquisition of the sensor value (S206), and repeats step S201 and steps after step S201. Standing by for acquiring the sensor value may be, for example, standing by for a fixed period of time or standing by until a sensor value is input from the sensor, such as until an NFC tag is detected.

When determining that the evaluation of the element probability needs to be ended (Yes in S205), the element probability evaluation unit 12 ends the process of FIG. 6. For example, when the rule probability evaluation unit 13 reports that the condition element set in the element probability evaluation unit 12 is invalid, or when forcible termination of evaluation is instructed by operation by the user, the element probability evaluation unit 12 determines that evaluation of the element probability needs to be terminated.

Note that when two or more condition elements are set for one element probability evaluation unit 12, for example, conversion to the element probability is executed for each condition element in step S202. Further, the determination in step S203 is executed for each condition element.

Figure 9:
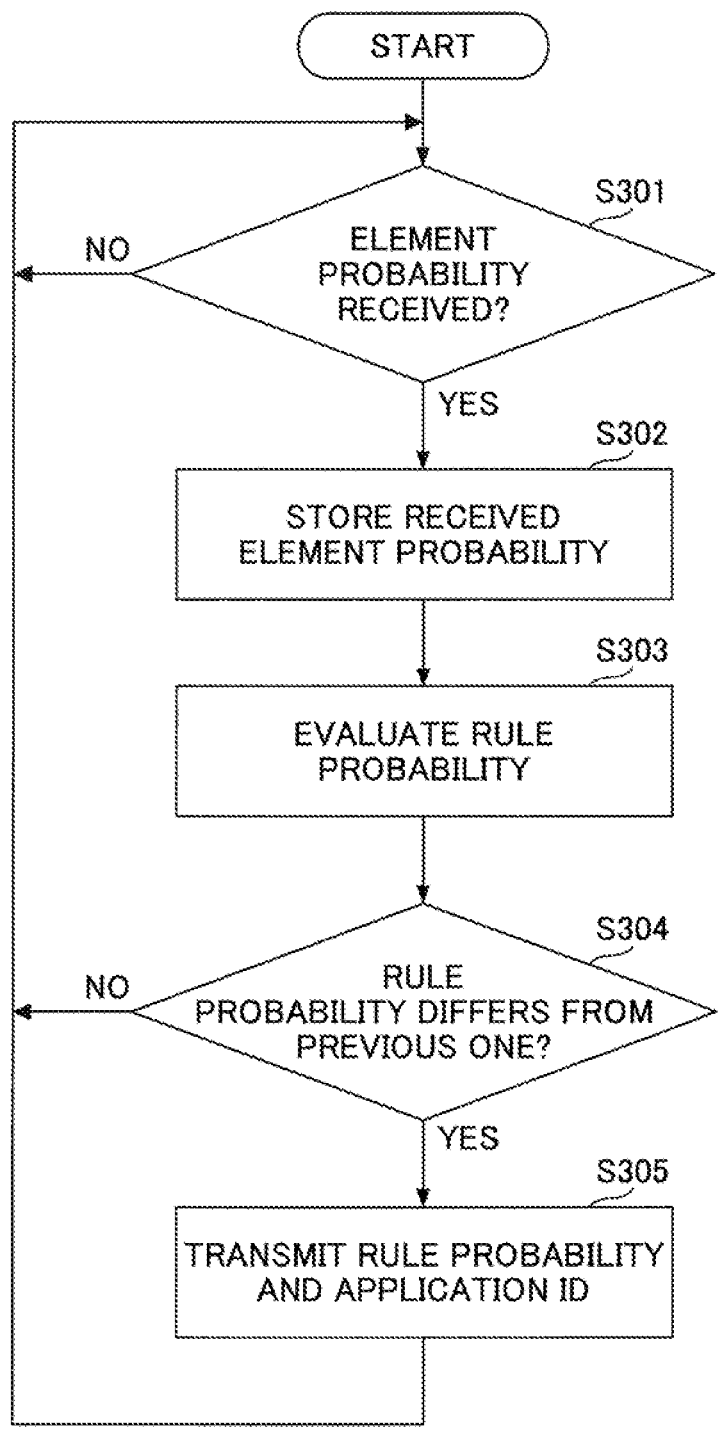
FIG. 9 is a flowchart illustrating an example of a process executed by a rule probability evaluation unit.

Subsequently, a process executed by the rule probability evaluation unit 13 that receives the element probability from each element probability evaluation unit 12 will be described. FIG. 9 is a flowchart illustrating an example of a process executed by a rule probability evaluation unit.

The rule probability evaluation unit 13 stands by for reception of the element probability from each element probability evaluation unit 12 (S301). When the element probability and the rule ID transmitted from any of the element probability evaluation units 12 are received (Yes in S301), the rule probability evaluation unit 13 stores the element probability in association with the rule ID, for example, in a memory 102 (S302). That is, for each rule ID, the element probability of each condition element related to the rule ID is stored.

Subsequently, the rule probability evaluation unit 13 evaluates the rule probability of the rule description (hereinafter referred to as "target rule description") to which the condition element related to the element probability (hereinafter referred to as "target element probability") received in step S301 belongs (S303). For example, when there is one condition element constituting the target rule description, the target element probability is directly used as the rule probability. However, when there are two or more condition elements constituting the target rule description, the target element probability and the element probability (hereinafter referred to as "related element probability") for other condition elements constituting the rule are applied to the execution condition of the rule description to calculate the rule probability. The related element probability may be stored in the memory 102 in association with the rule ID received in step S301. However, the value of a related element probability which has never been received is set to 0.0.

FIGS. 10A to 10E are diagrams each illustrating an example of calculation of a rule probability. FIGS. 10A to 10E each illustrate a specific element probability and a calculation result of the rule probability, for each specific execution condition.

Figure 10A:
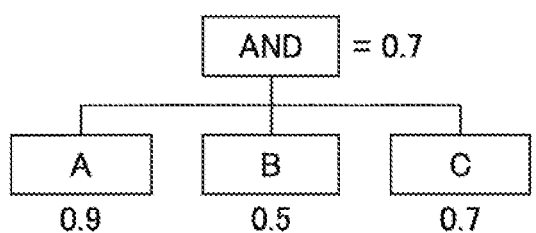
FIGS. 10A to 10E are diagrams each illustrating an example of calculation of a rule probability.

FIG. 10A illustrates a calculation result of the rule probability in a case where the rule description is AND (A, B, C), the element probability of A is 0.9, the element probability of B is 0.5, and the element probability of C is 0.7. Since the AND operator is the mean of all element probabilities, in this case, the rule probability is obtained as (0.9+0.5+0.7)/3=0.7.

Figure 10B:
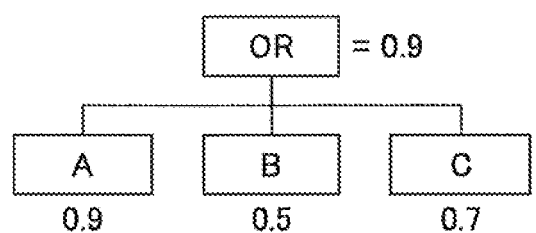

FIG. 10B illustrates a calculation result of the rule probability in a case where the rule description is OR (A, B, C), the element probability of A is 0.9, the element probability of B is 0.5, and the element probability of C is 0.7. Since the OR operator is the maximum value among all element probabilities, in this case, the rule probability is 0.9.

Figure 10C:
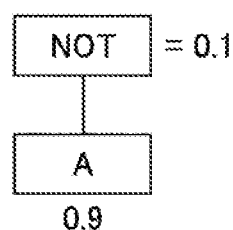

FIG. 10C illustrates a calculation result of the rule probability when the rule description is NOT (A) and the element probability of A is 0.9. In this case, the rule probability is obtained as 1−0.9=0.1.

Figure 10D:
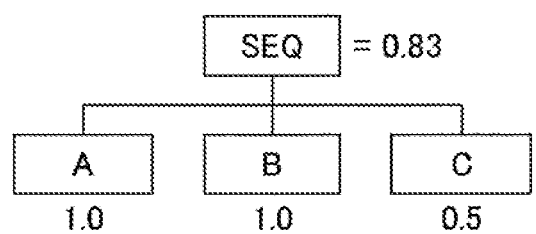

FIG. 10D illustrates a calculation result of the rule probability in a case where the rule description is SEQ (A, B, C), the element probability of A is 1.0, the element probability of B is 1.0, and the element probability of C is 0.5. However, it is assumed that the element probabilities of A and B reaches 1.0 in the order of A and B. In this case, the rule probability is obtained as (1.0+1.0+0.5)÷3=0.83.

Figure 10E:
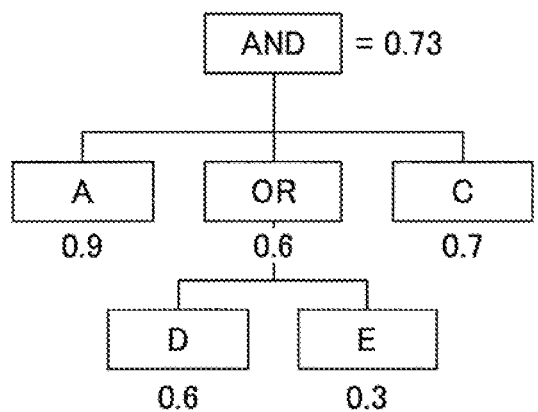

FIG. 10E illustrates a calculation result of the rule probability in a case where the rule description is AND (A, OR (D, E), C), the element probability of A is 0.9, the element probability of C is 0.6, the element probability of D is 0.6, and the element probability of E is 0.3. In this case, the maximum value of D and E is 0.6. Thus, the value of OR (D, E) is 0.6. In this case, the rule probability is obtained as (0.9+0.6+0.7)÷3=0.73.

Subsequently, the rule probability evaluation unit 13 determines whether the evaluation result (rule probability) in step S303 differs from the previous evaluation result (rule probability) related to the target rule description (S304). When the evaluation result relating to the target rule description differs from the previous one, the rule probability evaluation unit 13 transmits the rule probability which is the evaluation result in step S303 and the application ID of the target rule description to the application controller 14 (S305), and repeats step 301 and steps after S301. When the evaluation result relating to the target rule description is the same as the previous evaluation result (No in S304), step S305 is not be executed and step S301 and steps after step S301 may be repeated.

Next, a process executed upon receiving, by the application controller 14, the rule probability transmitted from the rule probability evaluation unit 13 will be described. FIG. 11 is a flowchart illustrating an example of a process executed in response to reception of a rule probability by an application controller 14.

Upon receiving the rule probability transmitted from the rule probability evaluation unit 13, the application controller 14 determines whether the rule probability is equal to or greater than a threshold (S401). The threshold may be a common value for all rule descriptions or may be a different value for each rule description. When the threshold is different for each rule description, a threshold may be included in the rule description. In this case, in step S305 of FIG. 9, the threshold included in the target rule description together with the rule probability and the application ID may be transmitted to the application controller 14.

When the rule probability is equal to or greater than the threshold (Yes in S401), that is, when the rule probability is within a predetermined range to 1.0, the application controller 14 transmits a Web application acquisition request including the application ID received together with the rule probability to the application acquisition unit 15.

In response to the Web application acquisition request, the application acquisition unit 15 determines whether a Web application (hereinafter referred to as "target application") corresponding to the application ID (hereinafter referred to as "target application ID") included in the acquisition request has already been acquired (S402). Such determination may be made based on whether the Web application corresponding to the application ID is stored in the application storage 121.

When the target application is not stored in the application storage 121 (No in S402), the application acquisition unit 15 transmits a Web application distribution request including the target application ID to the application management server 20 (S403). The application distribution unit 22 of the application management server 20 acquires the target application corresponding to the application ID included in the distribution request from the application storage 24 and returns the acquired target application to the application acquisition unit 15. The application acquisition unit 15 receives the returned target application, stores the target application in the application storage 121 in association with the target application ID (S404). At this time, the application acquisition unit 15 may encrypt the target application and store the encrypted target application in the application storage 121. Note that when the target application is stored in the application storage 121 (Yes in S402), steps S403 and S404 are skipped to proceed with step S405.

Subsequently, the application controller 14 determines whether the rule probability is 1.0 (S405). When the rule probability is less than 1.0 (No in S405), the application controller 14 places access an authorization restriction state on the target application (S406). For example, when the target application is activated, the application controller 14 requests the application execution unit 16 to stop the target application. In response to the request, the application execution unit 16 forcibly terminates the target application (disables access authorization of the target application). Further, the application controller 14 hides an icon of the target application on the home screen.

When the rule probability is 1.0 (Yes in S405), the application controller 14 releases the access authorization restriction state from the target application (S407). For example, the icon of the target application is displayed on the home screen. Subsequently, when the icon of the target application is operated by the user, the application execution unit 16 activates the target application (authorized to access the target application) (S408). Note that activation of the target application may be automatically performed following step S407.

When the rule probability is less than the threshold (No in S401); that is, when the rule probability is out of the predetermined range from 1.0, the application controller 14 transmits information indicating the rule probability being less than the threshold together with the target application ID to the application acquisition unit 15. Upon receiving the information, the application acquisition unit 15 determines whether the Web application corresponding to the target application ID (i.e., the target application) is stored in the application storage 121 (S409). When the target application is stored in the application storage 121 (Yes in S409), the application acquisition unit 15 determines whether the remaining capacity of the application storage 121 is insufficient (S410). For example, the application acquisition unit 15 determines whether the remaining capacity of the application storage 121 is equal to or less than a predetermined value. When the remaining capacity is equal to or less than the predetermined value (Yes in S410), the application acquisition unit 15 deletes the target application from the application storage 121 (S411). When the target application is not stored in the application storage 121 (No in S409) or when the storage capacity is not insufficient (No in S410), step S411 will not be executed. Note that when the target application is stored in the application storage 121, step S411 may be executed irrespective of the remaining capacity of the application storage 121.

An example of control relating to a Web application implemented based on the process described in FIG. 11 will be described. FIG. 12 is a diagram illustrating an example of control relating to a Web application. For convenience of explanation, FIG. 12 illustrates a control example of a Web application based on a rule description having the execution condition being from 10:00 to 11:00. Further, it is assumed that the target application is in a state of being not distributed.

At 9:30, when the rule probability becomes equal to or greater than the threshold, steps S403 and S404 of FIG. 4 are executed and the target application is acquired. However, since the rule probability is less than 1.0 at this point, the target application is set to be under the access authorization restriction state. When the rule probability reaches 1.0 at 10:00, steps S407 and S408 in FIG. 11 are executed, the access authorization restriction state of the target application is released, and the target application is activated. Thereafter, until 11:00, since the rule probability is 1.0, the user is able to use the target application.

When the time passes 11:00 and the rule probability becomes less than 1.0 after 11:00, step S406 in FIG. 11 is executed and the target application is under the access authorization restriction state. When the rule probability further decreases to become lower than the threshold, step S411 in FIG. 11 is executed according to the remaining capacity of the application storage 121. As a result, the target application is deleted from the application storage 121.

Subsequently, process contents executed by the user terminal 10 will be described for each specific rule description. FIG. 13 is a diagram illustrating process contents executed by a user terminal with respect to a first rule description.

When the application management server 20 registers the rule description r1 indicating that execution of a Web application a1 is permitted from 10:00 to 11:00 in the rule storage 23, the rule distribution unit 21 distributes the rule description r1 to each of the user terminals 10 (S501). A rule description r1 may be registered to be valid only for a specific user terminal 10. In this case, the rule distribution unit 21 may distribute the rule description r1 to the specific user terminal 10.

Upon receiving the rule description r1, the rule receiver 11 of the user terminal 10 sets the rule description r1 in the rule probability evaluation unit 13 (S502). The rule probability evaluation unit 13 sets a condition element "10:00 to 11:00" of the rule description r1 in an element probability evaluation unit 12a corresponding to the time sensor 106a (S503a). Note that the time sensor 106a is one of the sensors constituting the sensor group 106. For example, the time sensor 106a may be a clock. The element probability evaluation unit 12a, in which "10:00 to 11:00" is set as a condition element, periodically evaluates the element probability based on the evaluation function having the higher element probability as approaching 10:00, and reports an evaluation result to the rule probability evaluation unit 13 (S504a). The rule probability evaluation unit 13 reports the received element probability as the rule probability to the application controller 14 (S505). When the rule probability that is periodically reported from the rule probability evaluation unit 13 becomes equal to or greater than the threshold, the application controller 14 requests the application acquisition unit 15 to acquire a Web application related to the application ID included in the rule description r1 (S506). In response to the request, the application acquisition unit 15 acquires the Web application a1 related to the application ID from the application distribution unit 22 of the application management server 20 (S507), and stores the acquired Web application a1 in the application storage 121. At this point in time, the Web application a1 is placed under the access authorization restriction state.

Thereafter, when the time becomes 10:00 and the rule probability becomes 1.0, the application controller 14 releases the access authorization restriction state of the Web application a1 and requests the application execution unit 16 to activate the Web application a1 (S508). In response to the request, the application execution unit 16 reads the Web application a1 from the application storage 121 and activates the read Web application a1 (S509).

When the time passes 11:00 and the rule probability becomes less than 1.0 after 11:00, the application controller 14 requests the application execution unit 16 to stop the Web application a1 (S510). In response to the request, the application execution unit 16 forcibly terminates the Web application a1. At this time, the Web application a1 is placed under the access authorization restriction state. When the rule probability becomes less than the threshold value, the application controller 14 requests the application acquisition unit 15 to delete the Web application a1 as required (S511).

The application acquisition unit 15 deletes the Web application a1 from the application storage 121 (S512).

FIG. 14 is a diagram illustrating process contents executed by a user terminal with respect to a second rule description. In FIG. 14, the same components or the same steps as those in FIG. 13 are denoted by the same reference numerals, and a description of these will be omitted where appropriate.

FIG. 14 illustrates an example in which a rule description r2 indicating that execution of a Web application a2 is permitted at Shibuya station from 10:00 to 11:00 is registered in the rule storage 23.

In this case, the rule probability evaluation unit 13 sets a first condition element "10:00 to 11:00" of the rule description r2 in an element probability evaluation unit 12a (S503a). Further, the rule probability evaluation unit 13 sets a second condition element "Shibuya station" of the rule description r2 in an element probability evaluation unit 12b corresponding to a GPS sensor 106b (S503b). The GPS sensor 106b is one of the sensors constituting the sensor group 106, and outputs latitude and longitude measured by the GPS.

Similar to FIG. 13, the element probability evaluation unit 12a reports the element probability to the rule probability evaluation unit 13 (S504a). For example, the element probability evaluation unit 12b converts "Shibuya station" into range information based on latitude and longitude, evaluates the element probability based on the evaluation function that the element probability becomes higher as the latitude and longitude detected by the GPS sensor 106b approaches the range indicated by the range information, and reports the evaluation result to the rule probability evaluation unit 13 (S504b). Note that the timing at which the element probability evaluation unit 12a reports the element probability and the timing at which the element probability evaluation unit 12b reports the element probability may differ from each other.

The rule probability evaluation unit 13 evaluates the rule probability based on the two element probabilities and the logical operator AND every time the element probability is reported from any one of the element probability evaluation units 12a and 12b. In the present embodiment, the logical operator AND represents the mean of all element probabilities. Accordingly, the rule probability evaluation unit 13 defines the rule probability as the mean of the two element probabilities, and reports the rule probability to the application controller 14 (S505).

Other configurations and steps may be the same as in FIG. 13.

Figure 15:
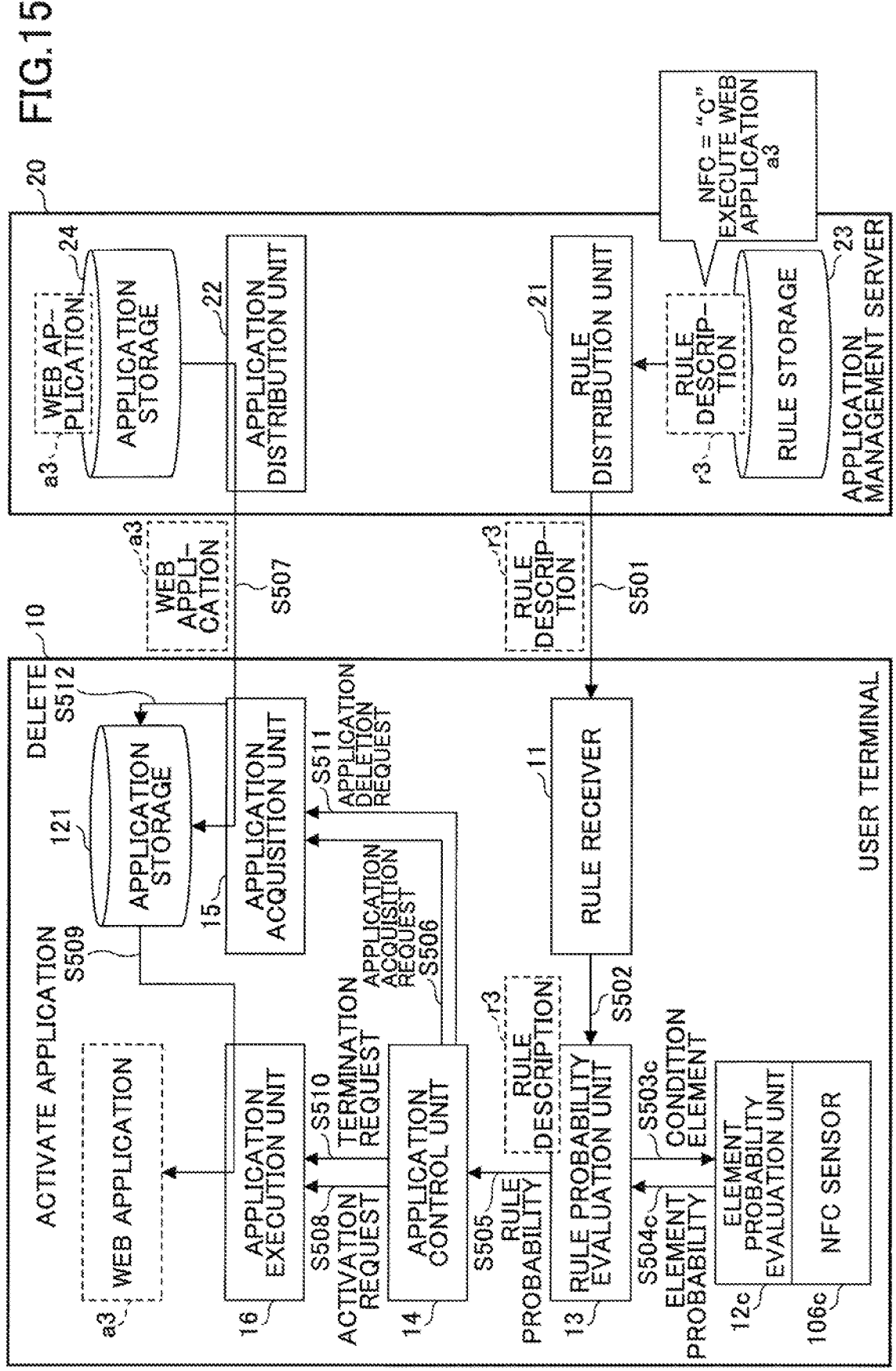
FIG. 15 is a diagram illustrating process contents executed by a user terminal with respect to a third rule description.

FIG. 15 is a diagram illustrating process contents executed by a user terminal with respect to a third rule description. In FIG. 15, the same components or the same steps as those in FIG. 13 are denoted by the same reference numerals, and a description of those will be omitted where appropriate.

FIG. 15 illustrates an example in which a rule description r3, indicating that execution of the Web application a3 is permitted, when "C" is detected as a value of the NFC tag, is registered in the rule storage 23.

In this case, the rule probability evaluation unit 13 sets "NFC=C", which is the condition element of the rule description r3, in an element probability evaluation unit 12c corresponding to an NFC sensor 106c (S503c). The NFC sensor 106c is one of the sensors constituting the sensor group 106, and outputs a value read from the NFC tag.

The element probability evaluation unit 12c evaluates the element probability based on the transition model illustrated in FIG. 8 and reports the evaluation result to the rule probability evaluation unit 13 (S504c). The rule probability evaluation unit 13 reports the received element probability as the rule probability to the application controller 14 (S505).

Other configurations and steps may be the same as in FIG. 13.

As described above, according to the present embodiment, the Web application is distributed to the user terminal before the execution condition of the Web application is satisfied. Accordingly, when the execution condition is satisfied, the user is able to assess or use the Web application immediately. Accordingly, access authorization of a Web application to be used under a predetermined condition may be facilitated.

In addition, the Web application delivered before the satisfaction of the execution condition is set in the access authorization restriction state until the execution condition is satisfied. Accordingly, it is possible to avoid disregarding of the mechanism for allowing the use of or access to the Web application according to a context, through the pre-distribution of the Web application.

Further, the timing of the pre-distribution of the Web application is determined based on the execution condition. Accordingly, it is possible for the administrator or the like to reduce the necessity of setting distribution conditions and the like separately from the execution condition, and it is possible to control against an increase in work burden of the administrator or the like.

Furthermore, the timing of the pre-distribution of the Web application, which is determined based on the execution condition, differs for each of the user terminals 10. That is, the timing at which the rule probability is equal to or greater than the threshold differs for each of the user terminals 10. Accordingly, it is possible to control against a sudden increase in the load of the application management server 20 caused by a large number of user terminals 10 simultaneously requesting distribution of the Web application.

In the present embodiment, the Web application is an example of a predetermined program. That is, this embodiment may be applied to a program other than the Web application. Further, the user terminal 10 is an example of an information processing terminal. The rule probability evaluation unit 13 is an example of a calculation unit. The application acquisition unit 15 is an example of an acquisition unit. The application controller 14 is an example of a restricting unit.

According to one embodiment, access authorization of a program to be used under a predetermined condition may be facilitated.

The embodiments of the present invention have been described in detail above; however, the present invention is not limited to a specific one of the embodiments, and various modifications and changes may be made within the scope described in the claims. Although the embodiments of the present invention have been described in detail above, the present invention is not limited to such specific embodiments, and various modifications and changes may be made within the scope of the gist of the invention described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. A program acquisition method performed by an information processing terminal, the program acquisition method comprising:
performing at least one of a first process and a second process,
the first process that calculates by an evaluation function, a probability that a first sensor value detected at the information processing terminal matches an activation time of a predetermined program for authorizing access to the predetermined program, the evaluation function representing the probability that rises as the activation time approaches, becomes 1.0 in a period after the activation time, and begins to decrease after the period lapses, and
the second process that sets a value to a probability that a second sensor value matches a position of the information processing terminal;
acquiring the predetermined program and storing the acquired predetermined program in a storage in response to the probability of matching at least one of the first sensor value and the second sensor value that becomes within a predetermined range from a first value to a second value before the probability reaches the first value, the first value corresponding to the activation time, the second value corresponding to an acquisition time for acquiring the predetermined program; and
restricting the access to the predetermined program stored in the storage until the probability of matching the at least one of the first sensor value and the second sensor value indicates the first value after the predetermined program is acquired, and authorizing the access to the predetermined program in a case in which the probability indicates the first value.

2. The program acquisition method as claimed in claim 1, wherein
de-authorizing the access to the predetermined program that has been authorized in response to the probability of matching indicating the first value in a case where the probability of matching no longer indicates the first value.

3. The program acquisition method as claimed in claim 1, further comprising:
deleting the predetermined program from the storage in response to the probability of matching falling outside the predetermined range.

4. An information processing terminal comprising a memory and one or more processors programmed to execute a process including:
performing at least one of a first process and a second process,
the first process that calculates by an evaluation function, a probability that a first sensor value detected at the information processing terminal matches an activation time of a predetermined program for authorizing access to the predetermined program, the evaluation function representing the probability that rises as the activation time approaches, becomes 1.0 in a period after the activation time, and begins to decrease after the period lapses, and
the second process that sets a value to a probability that a second sensor value matches a position of the information processing terminal;
acquiring the predetermined program and storing the acquired predetermined program in a storage in response to the probability of matching at least one of the first sensor value and the second sensor value that becomes within a predetermined range from a first value to a second value before the probability reaches the first value, the first value corresponding to the activation time, the second value corresponding to an acquisition time for acquiring the predetermined program; and
restricting the access to the predetermined program stored in the storage until the probability of matching the at least one of the first sensor value and the second sensor value indicates the first value after the predetermined program is acquired, and authorizing the access to the predetermined program in a case in which the probability indicates the first value.

5. The information processing terminal as claimed in claim 4, wherein
de-authorizing the access to the predetermined program that has been authorized in response to the probability of matching indicating the first value in a case where the probability of matching no longer indicates the first value.

6. The information processing terminal as claimed in claim 4, further comprising:
deleting the predetermined program from the storage in response to the probability of matching falling outside the predetermined range.

7. A non-transitory computer-readable recording medium having stored therein a program for causing an information processing terminal to execute a process comprising:
performing at least one of a first process and a second process,
the first process that calculates by an evaluation function, a probability that a first sensor value detected at the information processing terminal matches an activation time of a predetermined program for authorizing access to the predetermined program, the evaluation function representing the probability that rises as the activation time approaches, becomes 1.0 in a period after the activation time, and begins to decrease after the period lapses, and
the second process that sets a value to a probability that a second sensor value matches a position of the information processing terminal;
acquiring the predetermined program and storing the acquired predetermined program in a storage in response to the probability of matching at least one of the first sensor value and the second sensor value that becomes within a predetermined range from a first value to a second value before the probability reaches the first value, the first value corresponding to the activation time, the second value corresponding to an acquisition time for acquiring the predetermined program; and
restricting the access to the predetermined program stored in the storage until the probability of matching the at least one of the first sensor value and the second sensor value indicates the first value after the predetermined program is acquired, and authorizing the access to the predetermined program in a case in which the probability indicates the first value.

8. The non-transitory computer-readable recording medium as claimed in claim 7, wherein
de-authorizing the access to the predetermined program that has been authorized in response to the probability of matching indicating the first value in a case where the probability of matching no longer indicates the first value.

9. The non-transitory computer-readable recording medium as claimed in claim 7, further comprising:
deleting the predetermined program from the storage in response to the probability of matching falling outside the predetermined range.

\* \* \* \* \*